United States Patent
Nguyen et al.

(10) Patent No.: US 12,250,088 B2
(45) Date of Patent: Mar. 11, 2025

(54) DYNAMIC NOTE GENERATION IN COMMUNICATION SESSIONS

(71) Applicant: Zoom Communications, Inc., San Jose, CA (US)

(72) Inventors: Thanh Le Nguyen, Belle Chasse, LA (US); Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/306,661

(22) Filed: Apr. 25, 2023

(65) Prior Publication Data

US 2023/0261895 A1    Aug. 17, 2023

Related U.S. Application Data

(63) Continuation of application No. 17/555,385, filed on Dec. 18, 2021, now Pat. No. 11,716,215.

(51) Int. Cl.
| | |
|---|---|
| *H04L 12/18* | (2006.01) |
| *G06F 3/04842* | (2022.01) |
| *H04N 21/472* | (2011.01) |
| *H04N 21/4788* | (2011.01) |

(52) U.S. Cl.
CPC ...... *H04L 12/1831* (2013.01); *G06F 3/04842* (2013.01); *H04N 21/47217* (2013.01); *H04N 21/4788* (2013.01)

(58) Field of Classification Search
CPC ............ H04L 12/1831; G06F 3/04842; H04N 21/4788; H04N 21/47217
See application file for complete search history.

(56) References Cited

U.S. PATENT DOCUMENTS

| | | | | |
|---|---|---|---|---|
| 8,391,455 | B2 * | 3/2013 | Kelkar | H04M 3/56 709/227 |
| 2004/0143603 | A1 * | 7/2004 | Kaufmann | G09B 5/08 |
| 2004/0236830 | A1 * | 11/2004 | Nelson | H04L 65/403 709/204 |
| 2010/0157013 | A1 * | 6/2010 | Sylvain | H04N 7/14 348/14.01 |
| 2010/0245536 | A1 * | 9/2010 | Huitema | H04N 21/42203 348/E7.083 |
| 2011/0228921 | A1 * | 9/2011 | Singh | H04L 12/1831 379/202.01 |

(Continued)

FOREIGN PATENT DOCUMENTS

| | | | |
|---|---|---|---|
| CN | 109785677 A | * 5/2019 | |
| WO | WO-2023005575 A1 | * 2/2023 | ......... G06F 16/7867 |

OTHER PUBLICATIONS

Machine translation of WO-2023005575-A1 (Year: 2023).*

*Primary Examiner* — Ruolei Zong
(74) *Attorney, Agent, or Firm* — Young Basile Hanlon & MacFarlane, P.C.

(57) ABSTRACT

A note is dynamically generated with captured content from a communication session. At least a portion of the session content is recorded. A request to generate a note is received from one of the participants of the communication session. In response to receiving the request, the a note is generated that includes at least a designated portion of the recorded session content. Access to the portion of the session content identified in the note is granted to the requesting participant upon demand.

20 Claims, 10 Drawing Sheets

(56) References Cited

U.S. PATENT DOCUMENTS

| | | | |
|---|---|---|---|
| 2011/0302506 A1* | 12/2011 | Noyes | G11B 27/034 |
| | | | 715/753 |
| 2012/0030263 A1* | 2/2012 | John | G06F 16/48 |
| | | | 707/825 |
| 2012/0072524 A1* | 3/2012 | White | G06F 16/40 |
| | | | 709/213 |
| 2012/0072845 A1* | 3/2012 | John | G06F 16/48 |
| | | | 707/E17.046 |
| 2014/0212107 A1* | 7/2014 | Saint-Jean | G11B 27/031 |
| | | | 386/326 |
| 2016/0179831 A1* | 6/2016 | Gruber | G10L 19/018 |
| | | | 704/235 |
| 2016/0269788 A1* | 9/2016 | Jones | H04N 21/4781 |
| 2017/0188097 A1* | 6/2017 | Jones | G11B 27/34 |
| 2018/0295334 A1* | 10/2018 | Furesjö | G11B 27/34 |
| 2019/0036856 A1* | 1/2019 | Bergenlid | H04N 7/15 |
| 2021/0160242 A1* | 5/2021 | McKnight | G06Q 10/1091 |
| 2021/0258623 A1* | 8/2021 | Cyrell | H04L 65/1069 |

\* cited by examiner

DYNAMIC NOTE GENERATION IN COMMUNICATION SESSIONS

CROSS-REFERENCE TO RELATED APPLICATION(S)

This application is a continuation of U.S. application Ser. No. 17/555,385, filed Dec. 18, 2021, the entire disclosure of which is herein incorporated by reference.

FIELD

The present application relates generally to digital communication, and more particularly, to systems and methods for dynamically generating a note with captured content from a communication session.

SUMMARY

The appended claims may serve as a summary of this application.

BRIEF DESCRIPTION OF THE DRAWINGS

The present application relates generally to digital communication, and more particularly, to systems and methods providing for dynamically generating a note with captured content from a communication session.

The present disclosure will become better understood from the detailed description and the drawings, wherein.

DETAILED DESCRIPTION OF THE DRAWINGS

Figure 1A:
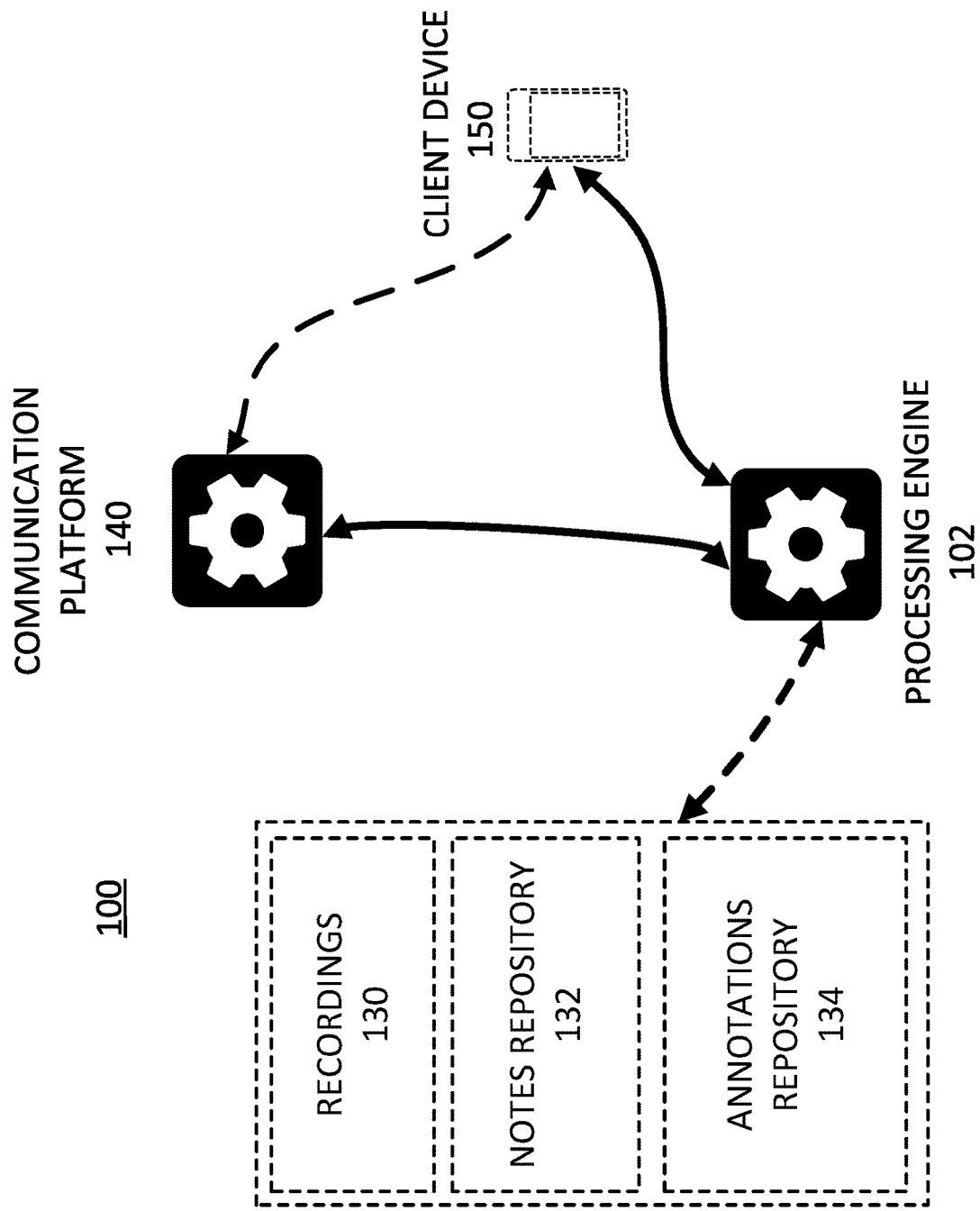
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

During a remote communication session, such as a remote video presentation, participants may be inclined to take notes of certain presented information that they deem to be important or they wish to study later. Since education is increasingly taking place during remote video-based communication sessions, students will frequently want to take notes on material being presented by teachers, such as, e.g., presentation slides, spoken content, or material that the teacher writes on a physical or virtual whiteboard.

However, this process of note-taking during a communication session is often neither easy nor streamlined. For example, if a student sees a presentation slide that she wishes to save for later study, she may have to follow a number of steps, including performing a full screen capture of her computer screen, switching to the screen capture application, manually cropping the full screen capture to just the presentation slide, then copying the cropped image to her notes document. While she is performing these steps, the teacher has moved on to additional material that she has been unable to keep up with and take notes on. Even just a few seconds of such a distraction can be costly when a student needs to absorb every moment of a lecture.

During the lecture, she may also think that what the professor just said is important to remember, but she did not have enough time to write down those words, and she also did not have a way to record just those words. She may use a third party application or the communication software itself to record the entire lecture, but recording just an important snippet of a teacher's audio and video may not be possible. Even if she did hit a record button upon her realization to begin recording the lecture, it wouldn't record the words the professor spoke 15 or 30 seconds ago, so the moment has already been lost.

Additional aspects of note-taking may also be unavailable to her. For instance, she may not be able to easily supplement a captured slide or recording with her own notes and annotations in such a way that the captured content and the annotations remain present together in a single document. If she does have a method for doing so, it may involve multiple time-consuming steps and multiple different applications. She also has no way of knowing what material other students in the lecture are finding important and worth taking notes on. This would help her understand which material her classmates are focusing on, and as a result would help her stay competitive with her classmates.

Thus, there is a need in the field of digital communication tools and platforms to create new and useful systems and methods for dynamically generating a note with captured content from a communication session. Such a note can function as a dynamic clipboard by capturing previous snippets from the meeting's content upon the participant selecting a UI element. The meeting content may be, e.g., presentation slides, graphs, or portions of a video presentation with a presenter appearing on a live video feed. While the meeting occurs, at least a portion of the session content can be recorded. Upon the participant interacting with the UI element, a designated segment of the session content that was recorded is used for generating a note. This may be, for example, the previous 15 seconds of the session content. In some embodiments, additional session content after the participant selects the UI element is also recorded and used for generating the note. For example, the previous 15 seconds before the participant selecting the UI element, as well as the 15 seconds directly following the participant selecting the UI element, are captured within the note. The participant can then access and play back the note at a later time. In various embodiments, the participant may be able to annotate the note, modify the designated window of time for recording, and more, as will be described in further detail below.

In one embodiment, a method presents, to each of a number of participants within a communication session, a UI which includes session content produced during the communication session. The method records at least a portion of the session content. The method receives a request from one of the participants to generate a note. In response to receiving the request, the method generates a note which includes at least a designated portion of the recorded session content. Finally, the method provides access to the requesting participant to the portion of the session content in the note upon demand.

In some embodiments, the method includes writing or overwriting the recording buffer(s) with portions of the session content before and/or after receiving the request, with the note additionally including a designated portion of the session content written to the recording buffer(s) before and/or after receiving the request.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., recordings 130, notes repository 132, and/or an annotations repository 134. One or more of the databases may be combined or split into multiple databases. The user's client device 150 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
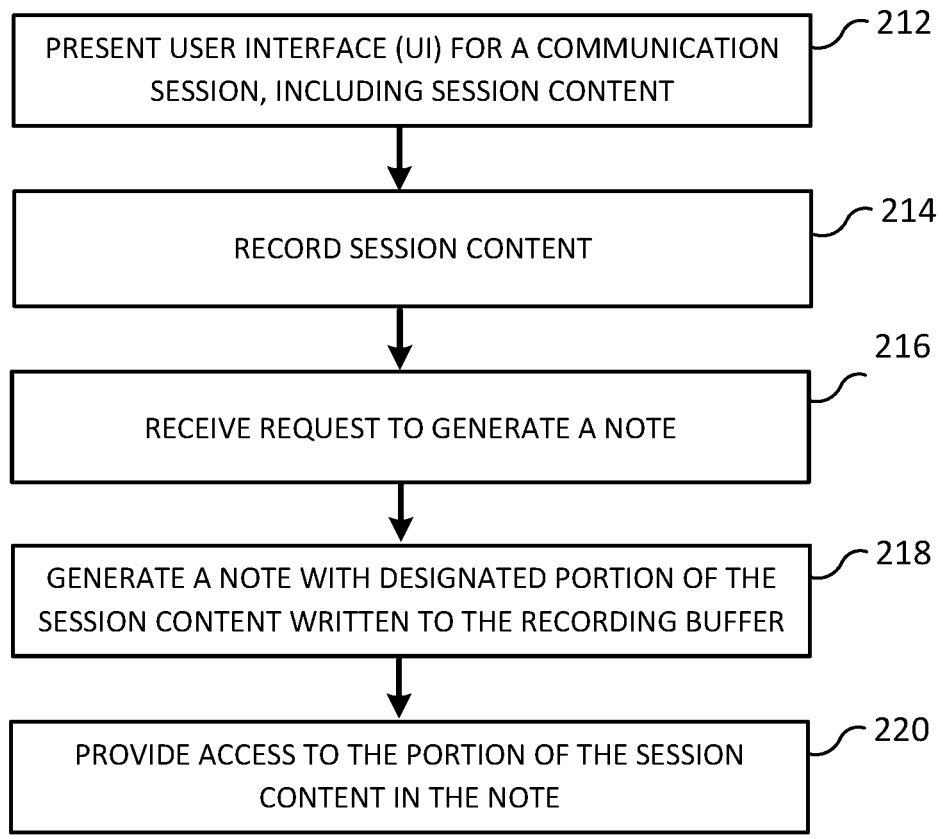
FIG. 2 is a flow chart illustrating an exemplary method that may be performed in some embodiments.

In an embodiment, the processing engine 102 may perform the exemplary method of FIG. 2 or other method herein and, as a result, dynamically generate a note with captured content from a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include one or more recordings 130, notes repository 132, and/or annotations repository 134. The optional repositories function to store and/or maintain, respectively, recordings of session content; notes that are generated for participants within communication sessions; and annotations which participants have included within the notes that have been generated for those participants. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations)

and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
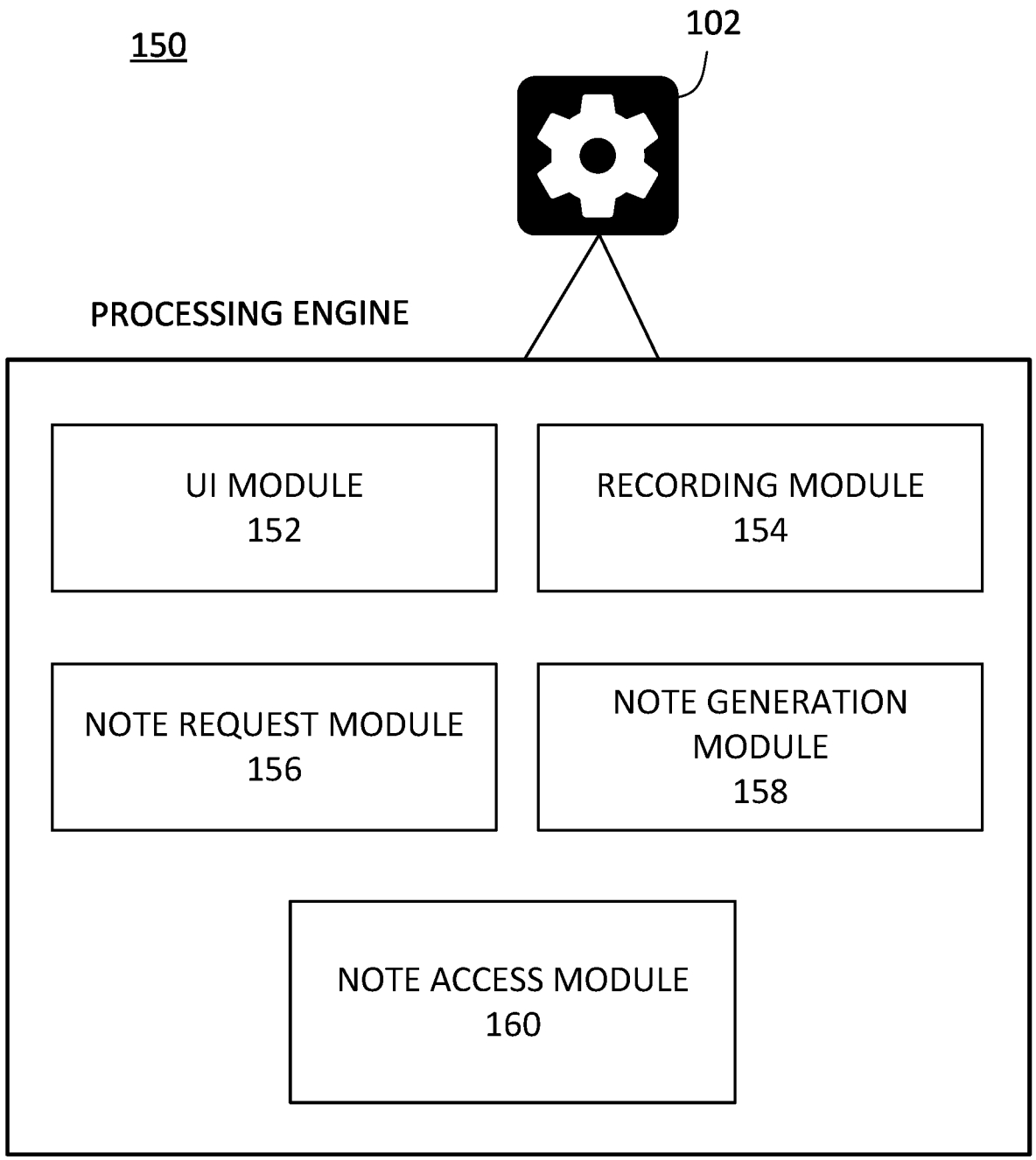
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

UI module 152 functions to display, for each of a number of participants within a communication session, a UI consisting of at least session content which is produced during that communication session. In some embodiments, participant windows, at least some of which contain video feeds of participants, are also included in the UI, as well as UI elements such as a note generation UI elements, as will be described further below.

Recording module 154 functions to record at least a portion of the session content. In some embodiments, the recording module 154 functions to continually write or overwrite to one or more recording buffers, in real time during a communication session, with portions of the session content of the communication session as it is being produced.

Note request module 156 functions to receive a request from one of the participants of the communication session to generate a note.

Note generation module 158 functions to generate a note in response to receiving the request. The note includes at least a designated portion of the recorded session content prior to or at the moment of receiving the request.

Note access module 160 functions to provide access to the requesting participant to the portion of the session content in the note upon demand.

The above modules and their functions will be described in further detail in relation to an exemplary method below.

FIG. 2 is a flow chart illustrating an exemplary method that may be performed in some embodiments.

At step 212, the system presents a UI for a communication session. The UI includes at least session content produced during the communication session. The UI is displayed for each of a number of participants within the communication session, although different participants may be presented with slightly different or customized UIs based on their preferences or other specifics. In some embodiments, the UI includes at least a number of participant windows corresponding to the number of participants, and a video for each of at least a subset of the participants. In some embodiments, the video for a participant is displayed within the corresponding participant window for that participant.

The UI can include session content in a number of potential ways. In some embodiments, the session content is presentation content presented by one or more presenting participants. For example, a presenter can present a number of presentation slides during the communication session. The presenter can also speak as he presents each slide, and potentially appear on video as well. In some embodiments, one or more presenters can present a prepared video while speaking. Other possibilities may include a presenter presenting a document such as a PDF or Word document, a presenter sharing his screen while talking, or a presenter drawing on a virtual whiteboard as he speaks. In some embodiments, rather than one or more presenters presenting material, the session content can include video, audio, or images from a number of participants as they discuss something, or engage in question-and-answer sessions. In some embodiments, audio and/or video streams of the one or more presenting participants can be included. In some embodiments, a portion of a transcript from the communication session can be included. This transcript may be automatically generated during the communication session, then included as session content. Many other such possibilities may be contemplated.

In some embodiments, the system connects participants to a live communication stream via their respective client devices. The communication stream may be any "session" (such as an instance of a video conference, webinar, informal chat session, or any other suitable session) initiated and hosted via the communication platform, for remotely communicating with one or more users of the communication platform, i.e., participants within the communication session. Participants are connected on user devices, and are associated with user accounts within the communication platform.

The UI for the communication session is displayed on the client device of each participant. In some embodiments, the UI appears different for different participants, or has different UI elements included for different participants depending on their user permissions, access levels (e.g., a premium-tier business user account as compared to a free-tier user account), or other aspects that may differentiate one participant from another within the communication platform. In various embodiments, the UI is configured to allow the participant to, e.g., navigate within the video communication session, engage or interact with one or more functional elements within the video communication session, control one or more aspects of the video communication session, and/or configure one or more settings or preferences within the video communication session.

In some embodiments, the system receives a number of video feeds depicting imagery of a number of participants, the video feeds each having multiple video frames. In some embodiments, the video feeds are each generated via an external device, such as, e.g., a video camera or a smartphone with a built-in video camera, and then the video content is transmitted to the system. In some embodiments, the video content is generated within the system, such as on a participant's client device. For example, a participant may be using her smartphone to record video of herself giving a lecture. The video can be generated on the smartphone and then transmitted to the processing system, a local or remote repository, or some other location. In some embodiments, one or more of the video feeds are pre-recorded and are retrieved from local or remote repositories. In various embodiments, the video content can be streaming or broadcasted content, pre-recorded video content, or any other suitable form of video content. The video feeds each have multiple video frames, each of which may be individually or collectively processed by the processing engine of the system.

In some embodiments, the video feeds are received from one or more video cameras connected to a client device associated with each participant. Thus, for example, rather than using a camera built into the client device, an external camera can be used which transmits video to the client device, or some combination of both.

In some embodiments, the participants are users of a communication platform, and are connected remotely within a virtual communication room generated by the communication platform. This virtual communication room may be, e.g., a virtual classroom or lecture hall, a group room, a breakout room for subgroups of a larger group, or any other suitable communication room which can be presented within a communication platform. In some embodiments, synchronous or asynchronous messaging may be included within the communication session, such that the participants are able to textually "chat with" (i.e., sends messages back and forth between) one another in real time.

In some embodiments, the UI includes a number of selectable UI elements. For example, one UI may present selectable UI elements along the bottom of a communication session window, with the UI elements representing options the participant can enable or disable within the video session, settings to configure, and more. For example, UI elements may be present for, e.g., muting or unmuting audio, stopping or starting video of the participant, sharing the participant's screen with other participants, recording the video session, and/or ending the video session.

In some embodiments, one or more UI elements may be present for taking a note. For example, a button may appear within the UI that reads "Take a Note". Upon the user clicking on the button or otherwise interacting with it, a request is initiated for the system to generate a note at that time. Such functionality will be discussed in greater detail below. An example of a UI element for taking a note will be discussed below with respect to FIG. 3.

In some embodiments, at least a portion of the UI displays a number of participant windows. The participant windows correspond to the multiple participants in the video communication session. Each participant is connected to the video communication session via a client device. In some embodiments, the participant window may include video, such as, e.g., video of the participant or some representation of the participant, a room the participant is in or virtual background, and/or some other visuals the participant may wish to share (e.g., a document, image, animation, or other visuals). In some embodiments, the participant's name (e.g., real name or chosen username) may appear in the participant window as well. One or more participant windows may be hidden within the UI, and selectable to be displayed at the user's discretion. Various configurations of the participant windows may be selectable by the user (e.g., a square grid of participant windows, a line of participant windows, or a single participant window). In some embodiments, the participant windows are arranged in a specific way according to one or more criteria, such as, e.g., current or most recent verbal participation, host status, level of engagement, and any other suitable criteria for arranging participant windows. Some participant windows may not contain any video, for example, if a participant has disabled video or does not have a connected video camera device (e.g. a built-in camera within a computer or smartphone, or an external camera device connected to a computer).

At step 214, the system records at least a portion of the session content. In various embodiments, the portion of the session content is recorded into a buffer, cache, local storage, remote server or cloud storage, or any other suitable space for storing recordings. In some embodiments, the portion of the session content to be recorded can be selected by the user. For example, the system may receive selection or interaction of one or more UI elements allowing the user to initiate recording of a section of session content during the communication session. UI elements may also allow the user to select content to record from the session content. The recording may happen at any point during the session content. In various embodiments, the recording, as well as any action to initiate recording or select a portion to record, can occur before, after, or concurrently to any of step 212, step 214, or step 216.

In some embodiments, the system writes or overwrites one or more recording buffers with portions of the session content. This is performed in real time during the communication session, and the writing or overwriting is done continually during the communication session. Upon the recording buffer(s) being written to capacity, the recording buffer(s) can be configured to be overwritten with portions of the session content such that session content is always being recorded to the buffer, regardless of its size. In some embodiments, the recording buffer(s) are located on the local client device of each participant, such that the recording is performed locally to the client device. In other embodiments, the buffer(s) are located remotely, such as on a remote cloud data server.

In various embodiments, a recording buffer may potentially be any buffer with any possible amount of storage space allocated to that buffer. In some embodiments, the buffer is configured to record audio, video, image captures, and/or any other media. In some embodiments, a single buffer is used to record one or more of such media. In some embodiments, multiple buffers are used individually or in combination to record media. For example, one buffer may be used to record audio as well as video, and another, separate buffer may only contain captured images. In another example, one buffer is used to record material from prior to a note request being generated, and a second buffer is used to record material after the note request has been generated, and portions of session content from both buffers are included in the note. In some embodiments, a buffer may include time stamps or may be synced in time with the duration of the communication session.

In one example embodiment, a local buffer with 500 MB allocated to it continually records audio and video of session content occurring during the communication session to a local client device of a participant. Upon the 500 MB capacity being reached, the buffer begins overwriting previously recorded content with session content as it is being produced. The buffer continually overwrites itself with new session content during the full duration of the communication session, and ends recording only once the communication session has terminated.

In some embodiments, the recorded session content includes only presentation content and portions of audio and/or video streams of one or more selected participants, and do not include any portions of audio and/or video streams from non-selected participants. Participants can be selected within this context either by default (e.g., presenting participants can be automatically selected by default), or can be selected by one or more host or administrator participants or other participants with granted access. In some embodiments, such participants can select participants from a drop-down list or similar UI element which lists participants to be selected. This ensures, for example, that only selected presenter(s) will be recorded for the purpose of generating notes, and never non-selected attendees. In some embodiments, audio and/or video which includes non-selected participants can be redacted or removed from the recorded session content. For example, blocks of audio where a non-selected, non-presenting participant asks a question can be "bleeped", i.e., the audio of that participant is replaced with a single tone, white noise, silence, or similar replacement. Similar, blocks of video that include a non-selected participant can be replaced by a black screen, a replacement image, blurred video, or similar. In some embodiments, such blocks may simply by skipped and not included in a recording, or included in the recording but not included in a note to be generated.

In some embodiments, at least a portion of session content may contain a glyph or similar image, text, metadata, or other data which indicates that this particular portion of the session content is not to be recorded or is not to be included within any generated notes. Such a glyph or other data thus indicates that there is a copying restriction on this material for purposes of preserving and enforcing copyright restrictions for the material. In some embodiments, the glyph can be in the form of a QR code. In some embodiments, such an indication may be applied to an entire meeting. The system is capable of recognizing this restrictive data and following the instructions to not record the portion of the session content or the meeting's entire session content, or to record but not include within any generated notes, for example. In one example, restrictive data in the form of a QR code appearing within presentation slides may indicate that the system is not to record the presentation slides. Resulting generated notes will thus not contain the presentation slides, but will still include video and audio from the presenting speaker. In some embodiments, a glyph, image, text, metadata, or other data can additionally or alternatively be recognized by the system which instructs the system to not allow a note for the image, or to allow only a note with one or more restrictions applied, such as, e.g., 10 seconds or less of a specific piece of copyrighted material may be included within a note, but not more than 10 seconds.

In some embodiments, one or more pieces of session content may be automatically identified and flagged within the system, and one or more actions may be automatically performed by the system with respect to that content. Content may be identified and flagged, for example, for constituting problematic, inappropriate, or illegal content, copyrighted content for which the copyrights do not include, e.g., permission to distribute or produce derivative works, or any other content. In various embodiments, the system may be identified by the system and/or one or more connected systems via, for example, an Application Programming Interface (API). In some embodiments, one or more machine learning models may be employed to perform the identification and flagging of the session content.

At step 216, the system receives a request from one of the participants to generate a note. In some embodiments, this request is received concurrently to session content being recorded. In some embodiments, this request is received concurrently to one or more recording buffer(s) being written or overwritten with session content. In some embodiments, this request to generate a note is initiated by the participant interactively selecting a UI element for taking a note. For example, a button in the lower right corner of the UI shown to the participant may read "Take a Note". Upon the user selecting that button, the system receives a request from that participant to generate a note during that time. Such an example will be further described below with respect to FIG. 3.

In some embodiments, the system receives an indication that a request to generate a note has been received from at least one participant of the communication session. The system then displays a notification within the UI of one or more additional participants that the first participant has requested a note to be generated for the current session content. For example, upon Anna requesting a note to be generated, other participants can receive a notification within the UI that Anna took a note on this material. Alternatively, rather than the notification including Anna's name, it may simply note that one participant has taken a note on the material. In some embodiments, rather than notifying when a single participant has taken a note, the system may notify only when a threshold number of participants taking notes has been exceeded.

In some embodiments, the system may be configured to detect one or more automated note taking conditions. The system may then automatically initiate the request to generate the note on behalf of the participant upon the detecting of the automated note taking condition(s). In this way, notes can be automatically generated for participants without them needing to select a note taking UI element. In some embodiments, the specific automated note taking conditions can be selected, customized, or adjusted by the participant in a settings, preferences, or options UI. Some examples of automated note taking conditions can include, e.g., the system receiving an indication of a number of participants exceeding a threshold requesting a note to be generated; the system receiving an indication or cue that the presenter considers the material to be noteworthy or otherwise indicates that the material should be captured by students; the system receives an indication that one or more key words or phrases have been detected in the session content; the system receives an indication that the participant's immediate supervisor or superior is speaking or presenting; or any other suitable conditions which may trigger the automatic generation of a note in a session.

At step 218, the system generates a note including at least a designated portion of the recorded session content prior to or at the moment of receiving the request. The system generates this note in response to the system receiving the request to generate the note during step 216. In some embodiments, the generated note is associated specifically with the requesting participant who requested the note to be generated, and remains connected to that participant's account or user profile within the communication platform for future playback and access. The designated portion of the session content to be included in the note is designated based on a prespecified amount or window of time in which recorded content is to be included. For example, a note may be generated 13 minutes into the communication session. If the prespecified amount of time for recorded content to be included is 30 seconds prior to the request to generate the note is received, then 30 seconds of recorded session content prior to receiving the request is included in the generated note. Therefore, content from 12:30 to 13:30 of the communication session is included in the note, resulting in a note with 1 minute of recorded session content.

In some embodiments, the note that is generated can additionally include a portion of a generated transcript that corresponds to or is time-synced with the designated portion of the session content to be included. In some embodiments, the system generates, in real time, a transcript for the session content as it is being produced within the communication session. The note the system generates then includes a subset of the generated transcript for the session content that corresponds to the portion of the session content in the note.

In some embodiments, when generating the note, the system automatically crops one or more visual portions of the designated session content that has been recorded to remove one or more UI elements visible in the designated session content. For example, the system can crop out portions of the recording which include participant windows with audio or video feeds from selected participants, such as, e.g., non-participating participants. The system can also, for example, crop out all participant windows to include only presentation content without any live video streams of presenting or non-presenting participants. UI elements can also be cropped out. Many other such possibilities for cropping out content can be included.

In some embodiments, after receiving the request to generate the note during step 216, the system continues to record content. This can be for a prespecified period of time, or indefinitely. In some embodiments, the system continues to write or overwrite recording buffer(s) with portions of the session content. The note generated by the system additionally includes a designated portion of the recorded session content after receiving the request. For example, in addition to 30 seconds of previous session content material being included in the generated note, an additional 30 seconds of material after the request is received is included. That is, after receiving the request, 30 more seconds of material is recorded, then the note is generated to include both 30 seconds of recorded material prior to the request being received, and 30 seconds of recorded material after the request is received. In this way, participants may have the benefit of a captured note which includes a full context of the material before and after the participant's decision to take a note, thus ensuring no important material has been missed.

In some embodiments, the designated portion of the session content to be included in the note is configured to be adjustable by one or more participants with granted permission. In some embodiments, the designated portion can be adjusted in a settings, preferences, or options UI prior to the note being generated. For example, either during a communication session or at a time prior to the communication session, the participant can navigate within a UI to a settings UI to configure a number of settings for communication sessions. One of the options for configuration within the settings UI can be an option to adjust the amount of time of recording to be included when taking a note. In varying embodiments, the amount of time to be adjusted can correspond to the amount of recorded material to include from prior to the participant requesting the note; the amount of recorded material to include from after the participant requests the note; or both. The system then uses these adjustments as the new designated portion of the session content to be included in the note.

In some embodiments, prior to the note being generated by the system, a note UI is presented to the participant. The note UI includes a number of selectable options which determine the content of the note to be generated. In some embodiments, the note UI includes a selectable UI element which allows the user to adjust the amount of time of recording to be included when taking the note, which determines the designated portion of recorded material to be included, as described above. In some embodiments, the note can be categorized into one or more categories. For example, the participant can categorize the note as one or more of: an action item, an observation, or a reference. In some embodiments, one or more annotations can be added by the participant to the note. For example, a participant may be able to type some annotations which appear alongside the session content, which can be notes to oneself about the material. In some embodiments, notes can be customized in any of a number of additional ways, such as, e.g., selecting whether to include only audio, only video, only image captures, only a transcript, or some combination thereof. Many other such customizations or additions to the note can be contemplated for inclusion within a note UI. An example of a note UI will be described below with respect to FIG. 4.

At step 220, the system provides access to the requesting participant to the portion of the session content in the note upon demand. In some embodiments, the access is provided even while the current communication session is still in progress, so a participant can access and review note material during the communication session if needed. In other embodiments, access is provided only after the communication session has completed. In some embodiments, access is provided both during the communication session, and after the communication session has completed. The access is offered "upon demand" in the sense that the UI presented to the participant provides a selectable UI element which allows the participant to access past generates notes whenever the user likes.

In some embodiments, access can be provided in the form of exporting the generated note to one or more playback formats which can be stored on a local client device of the participant. For example, an MP4 video file may be automatically generated on a remote server, and provided for download by the participant for offline viewing whenever the user wishes. Similarly, a number of images corresponds to visual slides presented during the communication session may be provided for the participant to download and store on their local device.

In some embodiments, access can be provided in the form of a note playback UI which is presented to the requesting participant. This note playback UI can be presented upon the participant selecting a UI element for playing back previously generated notes. In some embodiments, the note playback UI can include one or more selectable options for accessing or initiating playback of portions of the session content in the generated note, or one or more previously generated notes associated with the participant. In some embodiments, the note playback UI can include access to previously generated notes from the current communication session, previously generated notes from previous communication sessions, or both. In some embodiments, selectable options for accessing or initiating playback of portions of the session content in the note or previously generated note(s) can include one or more of, e.g.: playing back session content at an adjusted rate of speed; displaying a generated transcript alongside session content; displaying a captured visual slide alongside session content; displaying one or more participant annotations alongside session content; or any other suitable selectable options for playback or access. In some embodiments, the note playback UI can include one or more search UI elements configured to enable the participant to search for previously generated notes to be accessed or played back. Such search functionality can potentially include searching within a title of a note, searching within annotations for the note, searching within a transcript included within the note, searching within included session content itself, or other suitable options for searching for notes. Examples of a note playback UI will be described below with respect to FIG. 5A and FIG. 5B.

In some embodiments, any of the UIs described, including, e.g., the communication session UI, note generation UI, or note playback UI may include one or more mixed reality elements that can be displayed in mixed reality format on a client device. In one example, a user may see a 360-degree view within a communication session UI, with video feeds appearing in different locations within that view. A user may be able to select one or more video feeds to be included in recorded session content within a generated note.

In some embodiments, the system receives an indication that a number of requests to generate a note have been received from participants that exceeds a threshold number of requests within a designated window of time. For example, the system may receive an indication that over 10 participants in a class have requested a note to be generated within the timeframe of 13 minutes to 13:30 minutes into the communication session, representing a designated window of 30 seconds in which a threshold of 10 requests has been exceeded. Upon the system receiving this indication, but prior to receiving the request to generate the note from the participant in step 216, the system can display a recommended action within the UI for the participant. This recommended action can be a notification or message which appears within the UI, recommending the participant to pay attention to or request a note for the session content currently being produced within the communication session. In some embodiments, the recommended action can include the number of other participants who have requested a note during the designated window of time, or simply inform the participant that a large number of participants have requested a note. This recommended action may be intended to encourage the participant to take a note on the material being presented, because it may be deemed important by other participants. For example, other classmates might find this particular session content in the lecture to be noteworthy. In some embodiments, after the participant requests a note to be generated, the UI might inform the participant that other participants also requested a note during that window of time.

Figure 3:
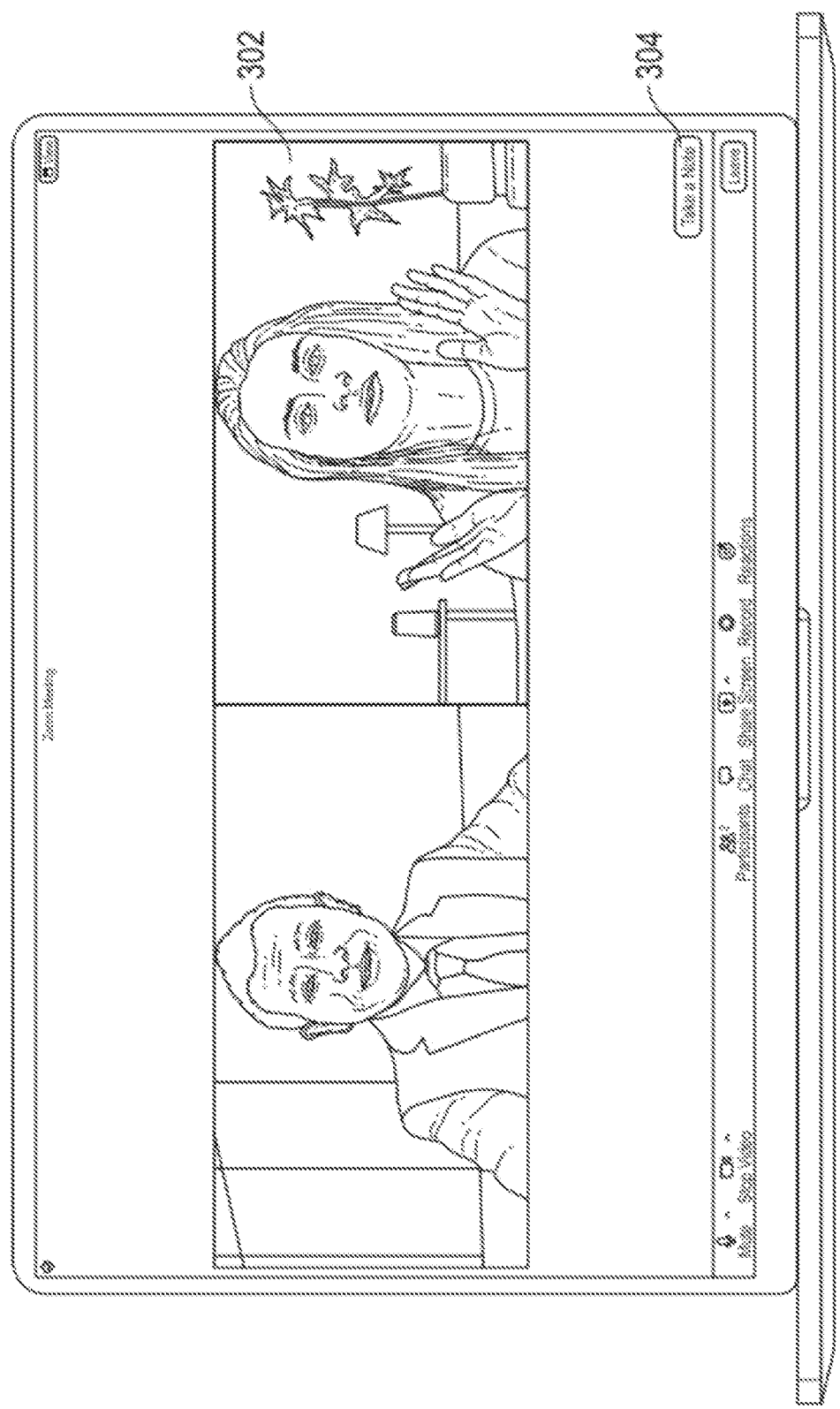
FIG. 3 is a diagram illustrating one example embodiment of a user interface (hereinafter "UI") for a communication session with a note generation UI element, according to some embodiments.

FIG. 3 is a diagram illustrating one example embodiment of a user interface (hereinafter "UI") for a communication session with a note generation UI element, according to some embodiments.

The illustration depicts a UI that a particular participant is viewing on a screen of the participant's client device. Two participant windows 302 are displayed within the UI, side by side. Within each participant window is a video. The video in each of the participant windows is a live video feed captured via a camera or other device that is either built into or connected to the client device of that participant, then streamed to the UIs of participants. Also appearing in the bottom right corner of the UI is a UI element 304 labeled "Take a Note", which represents a selectable UI element for the participant to request a note to be generated. The participant can choose to click on, or otherwise interact with this UI element. Upon interacting with the element, the system receives a request for a note to be generated by that requesting participant. In some embodiments, a note UI may then appear for the participant to customize the note or add annotations to the note. In other embodiments, the system may simply generate the note without requiring any additional input from the participant.

In some embodiments, a UI element may not need to be selected in order for a note request to be initiated. For example, as described above, the system may automatically initiate a request to generate a note for the participant upon detecting or receiving indication of one or more automated note taking conditions. A note or several notes can thus be generated without any manual input from the participant.

Figure 4:
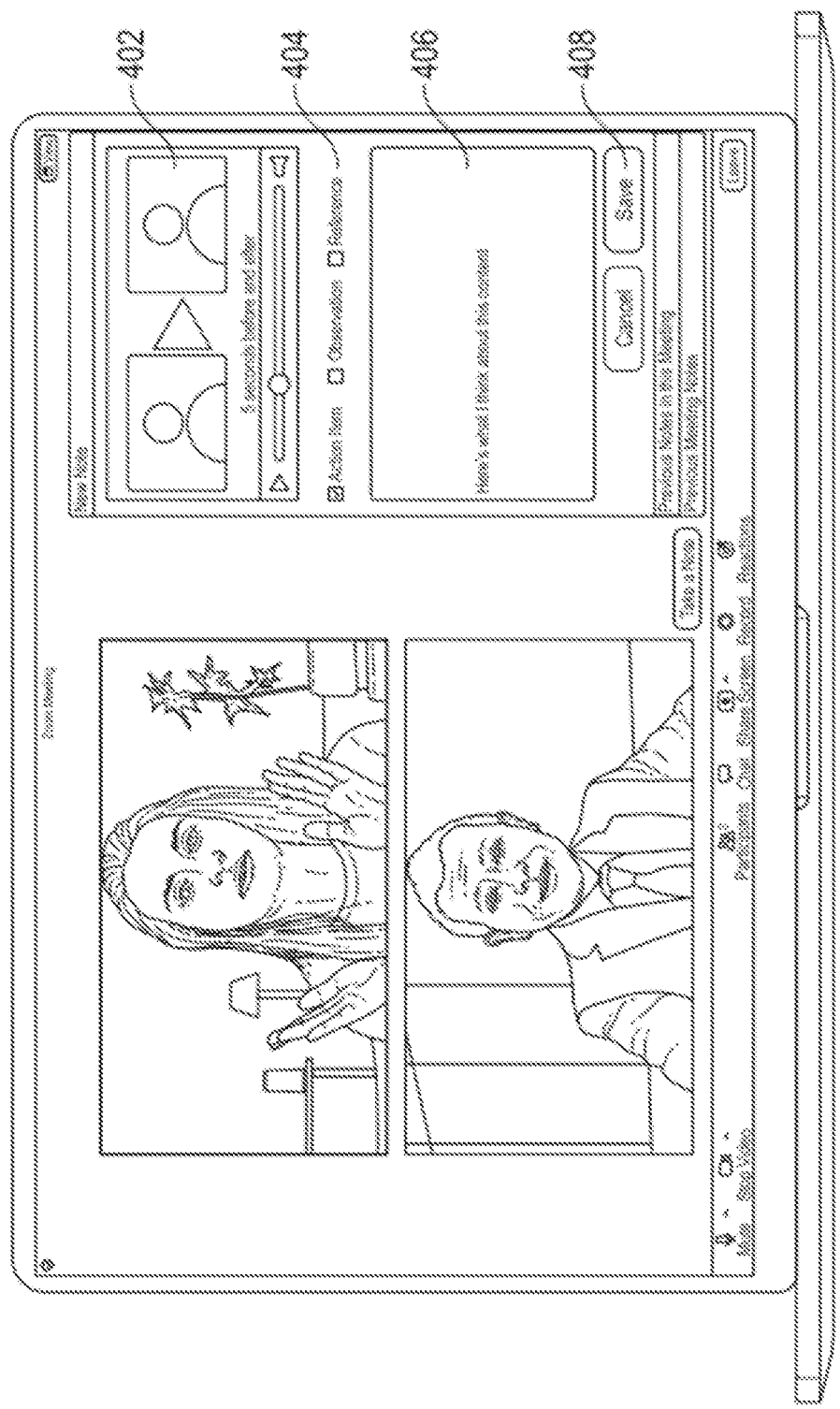
FIG. 4 is a diagram illustrating one example embodiment of a UI for generating a new note during a communication session, according to some embodiments.

FIG. 4 is a diagram illustrating one example embodiment of a UI for generating a new note during a communication session, according to some embodiments.

The illustration shows a note UI which can be presented to the participant upon the participant requesting a note to be generated. A preview UI element 402 can show previews of the beginning visual session content as well as the ending visual session content within the designated portion of session content to be included in the generated note. Below the preview UI element, a slider can provide the participant with the ability to adjust the designated portion of content to be included based on time. In this example, the slider is currently set to "5 seconds before and after", meaning content from 5 seconds prior to the system receiving the request, as well as content from 5 seconds after the system receiving the request, will be included in the generated note.

Categories 404 may allow the user to select one or more categories to place the note within. In this example, the participant has selected to categorize the note as an "action item", and not as an "observation" or "reference". In some embodiments, a participant may later sort previously recorded notes based on category, in order to retrieve, access, and play back notes of interest. In some embodiments, participants may have the option within a settings UI or other UI to add, remove, or modify categories to place notes within.

An annotation field 406 may allow the participant to add annotations to be included in the note. This allows participants to include notes to themselves within their notes, for further reference or study, or to jog the participant's memory on what the session content was about when accessing the note later. UI elements 408 include options to "cancel" or "save" the note, allowing the participant to proceed with generating the note or cancel the generation of the note.

Figure 5A:
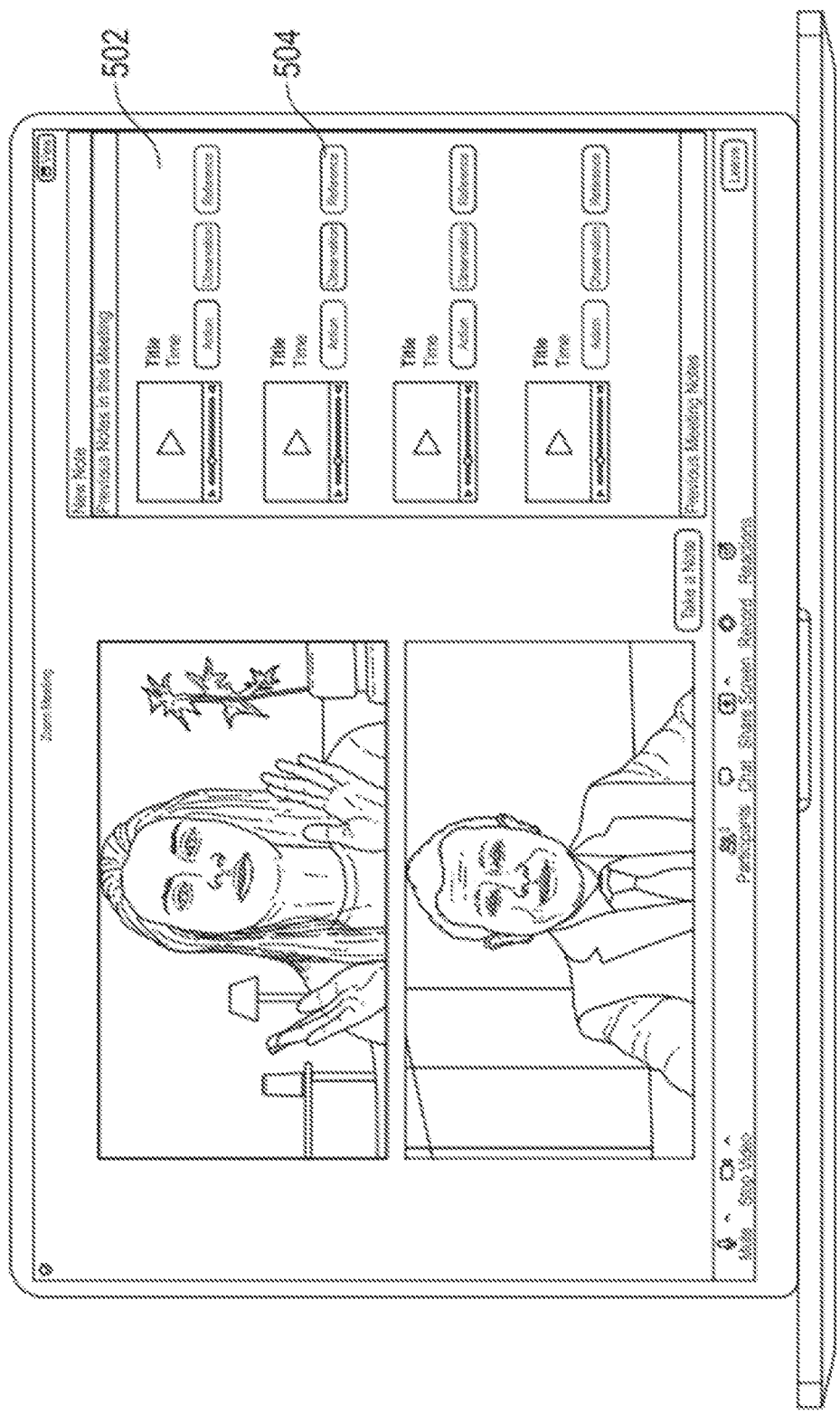
FIG. 5A is a diagram illustrating one example embodiment of a UI for accessing and playing back previously recorded notes from the communication session, according to some embodiments.

FIG. 5A is a diagram illustrating one example embodiment of a UI for accessing and playing back previously recorded notes from the communication session, according to some embodiments. A number of UI elements 502 each provide a preview of a previously generated note from the current communication session, a slider indicating the current playback time of the note if it is being played back by the participant, and options to pause or mute the playback. The participant may click on the preview of the note to play back the note. UI elements 504 additionally display the one or more categories which the note has been categorized as by the participant.

Figure 5B:
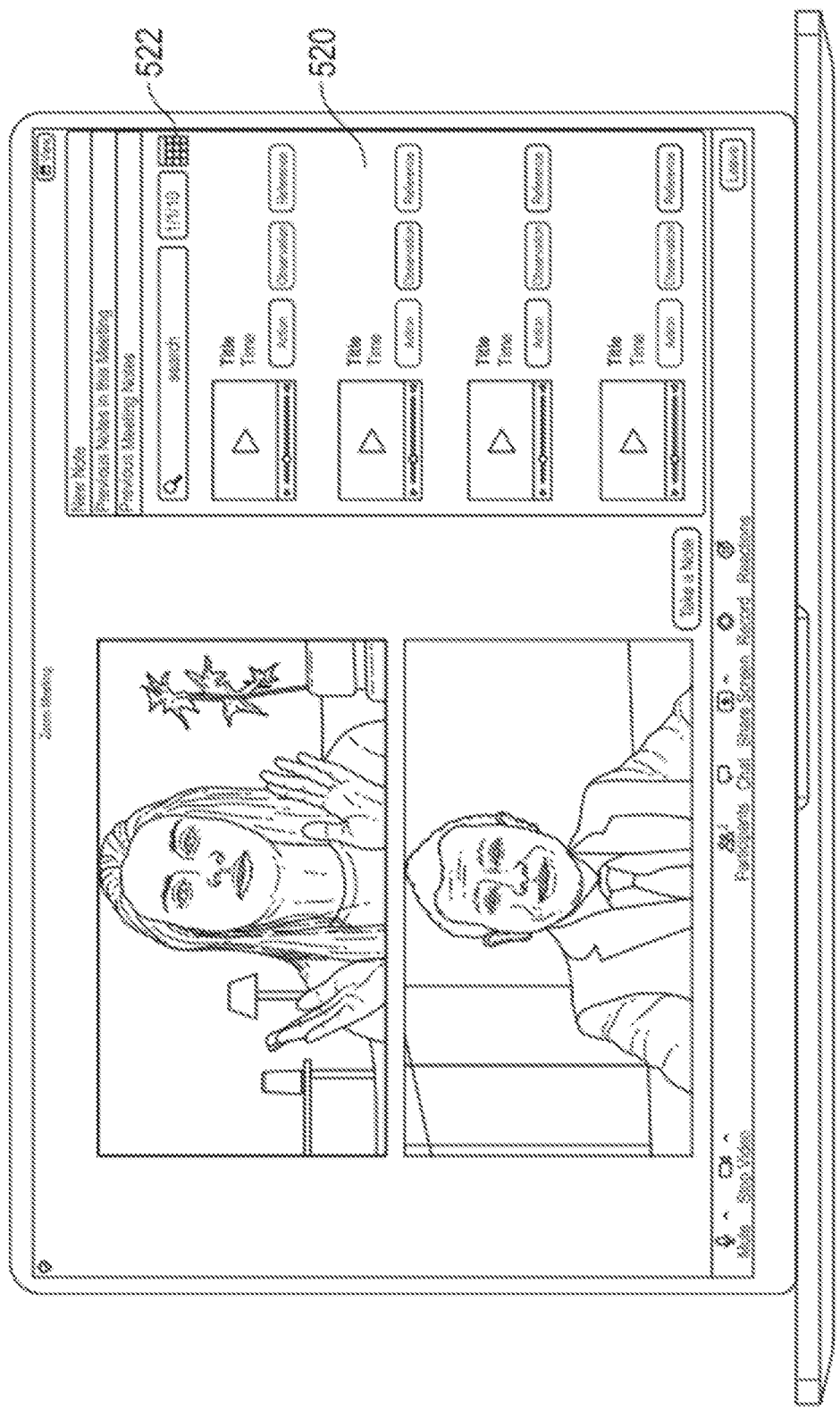
FIG. 5B is a diagram illustrating one example embodiment of a UI for accessing and playing back previously recorded notes from previous communication sessions, according to some embodiments.

FIG. 5B is a diagram illustrating one example embodiment of a UI for accessing and playing back previously recorded notes from previous communication sessions, according to some embodiments.

The illustration in FIG. 5B is similar to the illustrated in FIG. 5A, except that the notes displayed within the note playback UI are notes from previous communication sessions (i.e., "previous meeting notes"), rather than notes from the current communication session. The participant may select between tabs of "new note", "previous notes in this meeting", and "previous meeting notes" to access different UIs for note generation, note playback for notes in the current session, and note playback for notes from previous sessions, respectively. A number of search UI elements 522 are displayed, which allow a user to search for and filter results of notes from previous sessions. A number of note playback UI elements 520 also are displayed, as in FIG. 5A.

Figure 6:
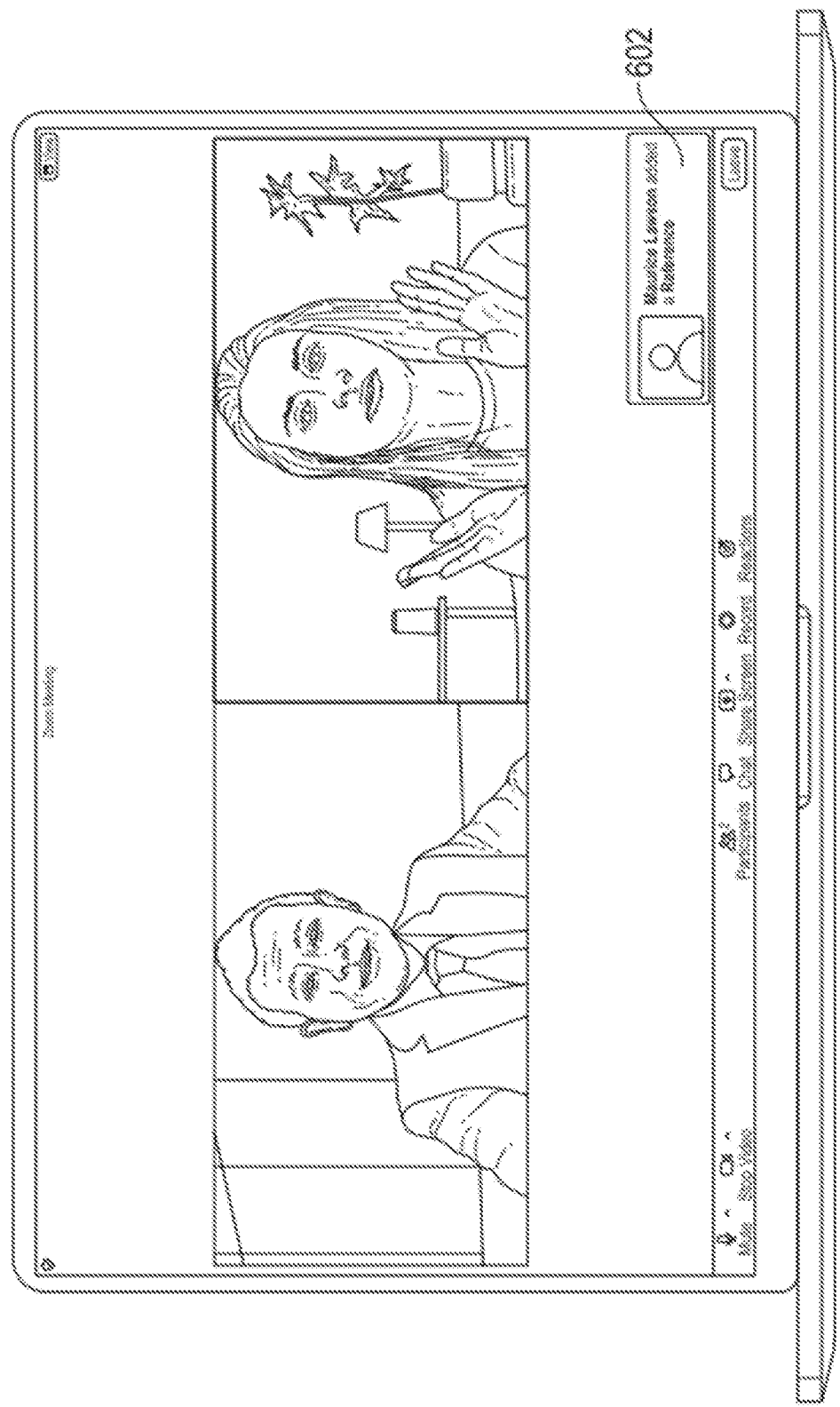
FIG. 6 is a diagram illustrating one example embodiment of a notification of a note being generated, according to some embodiments.

FIG. 6 is a diagram illustrating one example embodiment of a notification of a note being generated, according to some embodiments.

Within the illustration, the participant is viewing the communication session UI and viewing the session content of a communication session as two presenters talk and appear on video. A notification appears on the bottom right of the UI, informing the participant that "Maurice Lawson added a Reference". This informs the participant that another participant in the communication session has taken a note and categorized it as a "reference". This may be helpful for participants to understand when other participants are taking notes on material, as it may indicate that such material is noteworthy.

Figure 7:
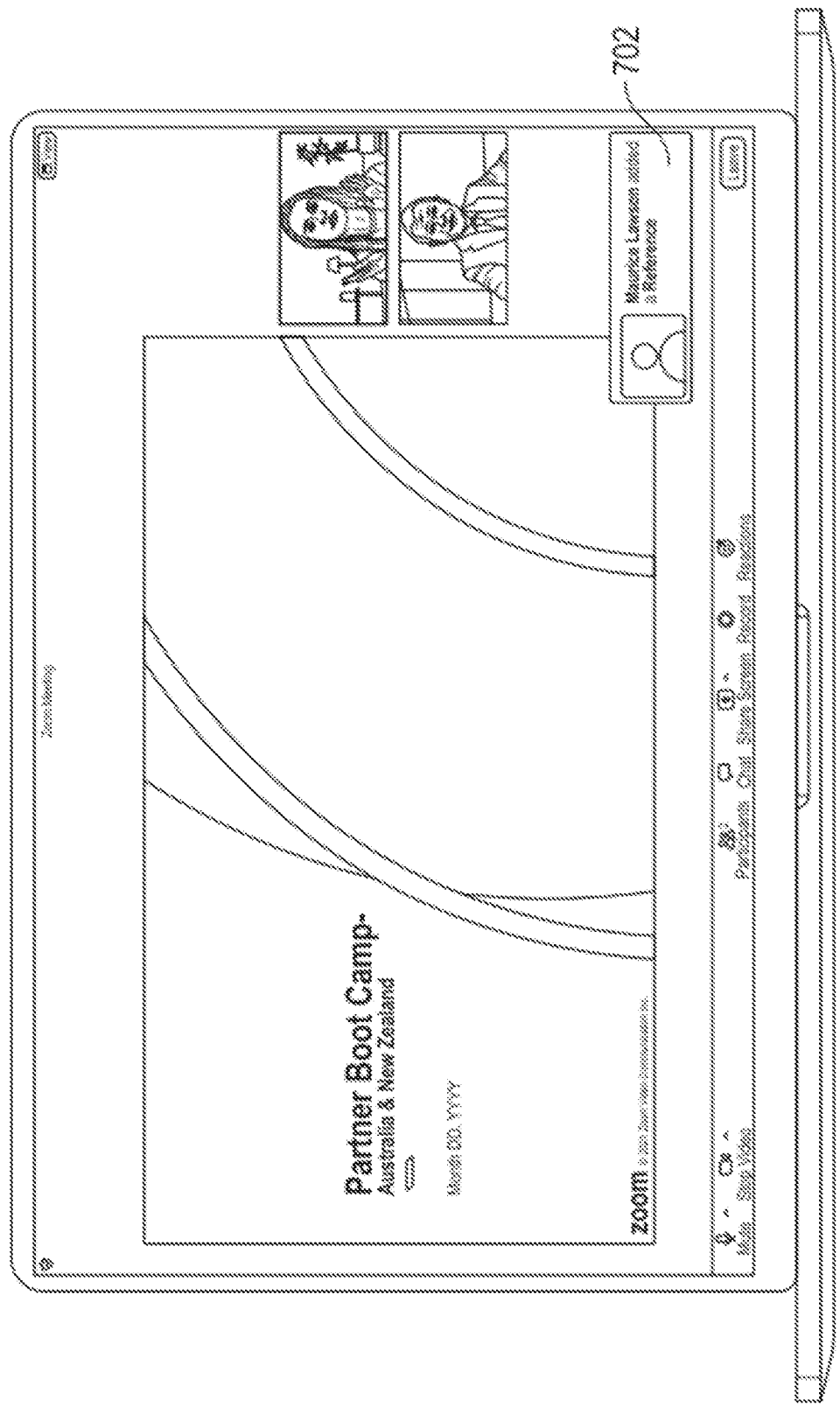
FIG. 7 is a diagram illustrating one example embodiment of a notification of a note being generated while a participant is presenting session content, according to some embodiments.

FIG. 7 is a diagram illustrating one example embodiment of a notification of a note being generated while a participant is presenting session content, according to some embodiments.

The illustration in FIG. 7 is similar to the illustration in FIG. 6, except the participant is presenting session content themselves. A visual slide appears as session content that is being presented by the participant. Two video feeds also appear to show the presenting participants as they speak. A notification has appeared, informing the presenting participant that one of the non-presenting participants has taken a note on the current material and classified it as a "reference". This may provide presenters with immediate information on when participants are engaging in the presentation and finding the presentation material to be noteworthy.

Figure 8:
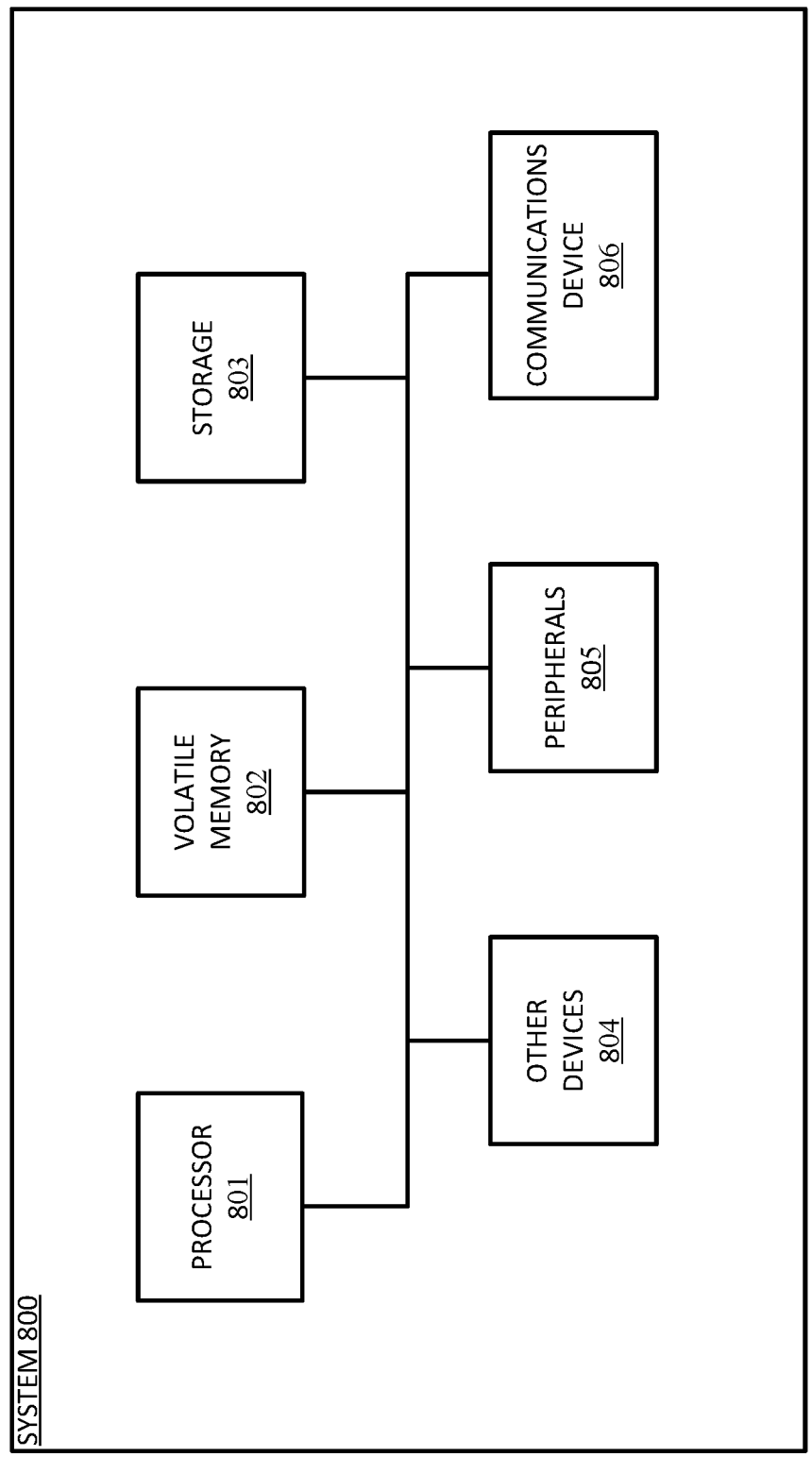
FIG. 8 is a diagram illustrating an exemplary computer that may perform processing in some embodiments.

FIG. 8 is a diagram illustrating an exemplary computer that may perform processing in some embodiments. Exemplary computer 800 may perform operations consistent with some embodiments. The architecture of computer 800 is exemplary. Computers can be implemented in a variety of other ways. A wide variety of computers can be used in accordance with the embodiments herein.

Processor 801 may perform computing functions such as running computer programs. The volatile memory 802 may provide temporary storage of data for the processor 801. RAM is one kind of volatile memory. Volatile memory typically requires power to maintain its stored information. Storage 803 provides computer storage for data, instructions, and/or arbitrary information. Non-volatile memory, which can preserve data even when not powered and including disks and flash memory, is an example of storage. Storage 803 may be organized as a file system, database, or in other ways. Data, instructions, and information may be loaded from storage 803 into volatile memory 802 for processing by the processor 801.

The computer 800 may include peripherals 805. Peripherals 805 may include input peripherals such as a keyboard, mouse, trackball, video camera, microphone, and other input devices. Peripherals 805 may also include output devices such as a display. Peripherals 805 may include removable media devices such as CD-R and DVD-R recorders/players. Communications device 806 may connect the computer 100 to an external medium. For example, communications device 806 may take the form of a network adapter that provides communications to a network. A computer 800 may also include a variety of other devices 804. The various components of the computer 800 may be connected by a connection medium such as a bus, crossbar, or network.

In an aspect, a method may include generating a note based on a recorded portion of a communication session that corresponds with a note request from a client device. The method may include granting the client device access, via the note, to the recorded portion of the communication session that corresponds with the note request.

In an aspect, a system may include a processor configured to generate a note based on a recorded portion of a communication session that corresponds with a note request from a client device. The processor may be configured to grant the client device access, via the note, to the recorded portion of the communication session that corresponds with the note request.

In an aspect, a non-transitory computer-readable medium comprising instructions, that when executed by a processor, cause the processor to perform operations including generating a note based on a recorded portion of a communication session that corresponds with a note request from a client device. The operations may include granting the client device access, via the note, to the recorded portion of the communication session that corresponds with the note request.

In one or more aspects, a portion of the session content may be recorded during the communication session. In one or more aspects, a portion of the session content may be written to a buffer. In one or more aspects, it may be determined that the buffer is at a maximum capacity. In one or more aspects, the portion of the session content may be overwritten. In one or more aspects, the portion of the session content may include presentation content displayed during the communication session. In one or more aspects, a designated portion of the portion of the session content may be defined according to an adjustable criteria. In one or more aspects, the adjustable criteria may include the session content that is transmitted during an adjustable window of time prior to a time of receipt of the note request. In one or more aspects, the note may be selectable for individual access or playback. In one or more aspects, the portion of the portion of the session content may include respective portions of an audio stream or a video stream of the communication session. In one or more aspects, the audio stream or the video stream may be associated with a selected device of the communication session. In one or more aspects, it may be determined that a number of note requests received exceeds a threshold number of requests within a defined time range. In one or more aspects, a transcript of the communication session may be generated, wherein the note comprises a subset of the transcript.

It will be appreciated that the present disclosure may include any one and up to all of the following examples.

Example 1. A method comprising: 1. A method, comprising: presenting, to each of a plurality of participants within a communication session, a user interface (UI), the UI comprising session content produced during the communication session; recording at least a portion of the session content; concurrent to the writing or overwriting of the one or more recording buffers, receiving a request from one of the participants to generate a note; in response to receiving the request, generating a note, the note comprising a designated portion of the recorded session content prior to or at the moment of receiving the request; and providing access to the requesting participant to the portion of the session content in the note upon demand.

Example 2. The method of Example 1, wherein the recording of at least a portion of the session content comprises writing or overwriting one or more recording buffers, in real time during the communication session, with portions of the session content as it is being produced, wherein receiving the request from one of the participants to generate the note occurs concurrently to the writing or overwriting of the one or more recording buffers.

Example 3. The method of Example 2, further comprising: continuing to write or overwrite the one or more recording buffers with portions of the session content after receiving the request, wherein the note additionally comprises a designated portion of the session content written to the one or more recording buffers after receiving the request.

Example 4. The method of any of Examples 1-3, wherein the recorded session content comprises presentation content and portions of the audio and/or video streams of one or more selected participants, and do not comprise any portions of audio and/or video streams from non-selected participants.

Example 5. The method of any of Examples 1-4, wherein the session content produced during the communication session comprises: presentation content presented by one or more presenting participants, and audio and/or video streams of the one or more presenting participants.

Example 6. The method of Example 5, wherein the presentation content comprises one or more visual slides, and wherein the recorded session content comprises one or more image captures of the visual slides.

Example 7. The method of any of Examples 1-6, wherein the designated portion of the session content to be included in the note is configured to be adjustable by one or more participants with granted permission.

Example 8. The method of any of Examples 1-7, wherein the session content comprises audio and/or video content generated during the session, and wherein the recorded session content to be included in the note comprises audio and/or video content for a designated window of time prior to receiving the request to generate the note.

Example 9. The method of any of Examples 1-8, further comprising: receiving an indication that a plurality of requests to generate a note have been received from participants that exceeds a threshold number of requests within a designated window of time; prior to receiving the request to generate the note from the participant, displaying a recommended action within the UI for the participant to pay attention to or request a note for the session content being produced.

Example 10. The method of any of Examples 1-9, further comprising: presenting, to the requesting participant, a note UI comprising selectable options for one or more of: customizing, categorizing, or adding annotation content to the portion of the session content to be included in the note.

Example 11. The method of any of Examples 1-10, further comprising: presenting, to the requesting participant, a note playback UI comprising one or more selectable options for accessing or initiating playback of portions of the session content in the note or one or more previously generated notes associated with the participant.

Example 12. The method of Example 11, wherein the selectable options for accessing or initiating playback of portions of the session content in the note or one or more previously generated notes comprise one or more of: playing back session content at an adjusted rate of speed, displaying a generated transcript alongside session content, displaying a captured visual slide alongside session content, and displaying one or more participant annotations alongside session content.

Example 13. The method of any of Examples 1-12, further comprising: generating, in real time, a transcript for the session content as it is being produced within the communication session, wherein the note additionally comprises a subset of the generated transcript for the session content that corresponds to the portion of the session content in the no Example 14. The method of any of Examples 1-13, further comprising: presenting, to a participant of the communication session, a note selection UI comprising a plurality of previously generated notes associated with the participant which can be selected for individual access or playback.

Example 15. The method of Example 14, wherein the note selection UI comprises one or more search UI elements configured to enable the participant to search for previously generated notes to be accessed or played back.

Example 16. The method of any of Examples 1-15, wherein generating the note comprises cropping one or more visual portions of the recorded session content to remove one or more UI elements visible in the recorded session content.

Example 17. The method of any of Examples 1-16, wherein the request from one of the participants to generate a note is initiated by the participant by interactively selecting a UI element for taking a note.

Example 18. The method of any of Examples 1-17, wherein the one or more processors are further configured to perform the operations of: detecting one or more automated note taking conditions, wherein the request from one of the participants to generate a note is automatically initiated based on the detecting of the one or more automated note taking conditions.

Example 19. A communication system comprising one or more processors configured to perform the operations of: presenting, to each of a plurality of participants within a communication session, a user interface (UI), the UI comprising session content produced during the communication session; recording at least a portion of the session content; concurrent to the writing or overwriting of the one or more recording buffers, receiving a request from one of the participants to generate a note; in response to receiving the request, generating a note, the note comprising a designated portion of the recorded session content prior to or at the moment of receiving the request; and providing access to the requesting participant to the portion of the session content in the note upon demand.

Example 20. The communication system of Example 19, wherein the recording of at least a portion of the session content comprises writing or overwriting one or more recording buffers, in real time during the communication session, with portions of the session content as it is being produced, wherein receiving the request from one of the participants to generate the note occurs concurrently to the writing or overwriting of the one or more recording buffers.

Example 21. The communication system of Example 20, wherein the one or more processors are further configured to perform the operations of: continuing to write or overwrite the one or more recording buffers with portions of the session content after receiving the request, wherein the note additionally comprises a designated portion of the session content written to the one or more recording buffers after receiving the request.

Example 22. The communication system of any of Examples 19-21, wherein the recorded session content comprises presentation content and portions of the audio and/or video streams of one or more selected participants, and do not comprise any portions of audio and/or video streams from non-selected participants.

Example 23. The communication system of any of Examples 19-22, wherein the session content produced during the communication session comprises: presentation content presented by one or more presenting participants, and audio and/or video streams of the one or more presenting participants.

Example 24. The communication system of Example 23, wherein the presentation content comprises one or more visual slides, and wherein the recorded session content comprises one or more image captures of the visual slides.

Example 25. The communication system of any of Examples 19-24, wherein the designated portion of the session content to be included in the note is configured to be adjustable by one or more participants with granted permission.

Example 26. The communication system of any of Examples 19-25, wherein the session content comprises audio and/or video content generated during the session, and wherein the recorded session content to be included in the note comprises audio and/or video content for a designated window of time prior to receiving the request to generate the note.

Example 27. The communication system of any of Examples 19-26, wherein the one or more processors are further configured to perform the operations of: receiving an indication that a plurality of requests to generate a note have been received from participants that exceeds a threshold number of requests within a designated window of time; prior to receiving the request to generate the note from the participant, displaying a recommended action within the UI for the participant to pay attention to or request a note for the session content being produced.

Example 28. The communication system of any of Examples 19-27, wherein the one or more processors are further configured to perform the operations of: presenting, to the requesting participant, a note UI comprising selectable options for one or more of: customizing, categorizing, or adding annotation content to the portion of the session content to be included in the note.

Example 29. The communication system of any of Examples 19-28, wherein the one or more processors are further configured to perform the operations of: presenting, to the requesting participant, a note playback UI comprising one or more selectable options for accessing or initiating playback of portions of the session content in the note or one or more previously generated notes associated with the participant.

Example 30. The communication system of Example 29, wherein the selectable options for accessing or initiating playback of portions of the session content in the note or one or more previously generated notes comprise one or more of: playing back session content at an adjusted rate of speed, displaying a generated transcript alongside session content, displaying a captured visual slide alongside session content, and displaying one or more participant annotations alongside session content.

Example 31. The communication system of any of Examples 19-30, wherein the one or more processors are further configured to perform the operations of: generating, in real time, a transcript for the session content as it is being produced within the communication session, wherein the note additionally comprises a subset of the generated transcript for the session content that corresponds to the portion of the session content in the note.

Example 32. The communication system of any of Examples 19-31, wherein the one or more processors are further configured to perform the operations of: presenting, to a participant of the communication session, a note selection UI comprising a plurality of previously generated notes associated with the participant which can be selected for individual access or playback.

Example 33. The communication system of Example 32, wherein the note selection UI comprises one or more search UI elements configured to enable the participant to search for previously generated notes to be accessed or played back.

Example 34. The communication system of any of Examples 16-30, wherein generating the note comprises cropping one or more visual portions of the recorded session content to remove one or more UI elements visible in the recorded session content.

Example 35. The communication system of any of Examples 16-34, wherein the request from one of the participants to generate a note is initiated by the participant by interactively selecting a UI element for taking a note.

Example 36. The communication system of any of Examples 16-35, wherein the one or more processors are further configured to perform the operations of: detecting one or more automated note taking conditions, wherein the request from one of the participants to generate a note is automatically initiated based on the detecting of the one or more automated note taking conditions.

Example 37. A non-transitory computer-readable medium containing instructions for generating a note with session content from a communication session, comprising: instructions for presenting, to each of a plurality of participants within a communication session, a user interface (UI), the UI comprising session content produced during the communication session; instructions for recording at least a portion of the session content; concurrent to the writing or overwriting of the one or more recording buffers, instructions for receiving a request from one of the participants to generate a note; in response to receiving the request, instructions for generating a note, the note comprising a designated portion of the recorded session content prior to or at the moment of receiving the request; and instructions for providing access to the requesting participant to the portion of the session content in the note upon demand.

Example 38. The non-transitory computer-readable medium of Example 37, wherein the recording of at least a portion of the session content comprises writing or overwriting one or more recording buffers, in real time during the communication session, with portions of the session content as it is being produced, wherein receiving the request from one of the participants to generate the note occurs concurrently to the writing or overwriting of the one or more recording buffers.

Example 39. The non-transitory computer-readable medium of Example 38, further comprising: instructions for continuing to write or overwrite the one or more recording buffers with portions of the session content after receiving the request, wherein the note additionally comprises a designated portion of the session content written to the one or more recording buffers after receiving the request.

Example 40. The non-transitory computer-readable medium of any of Examples 37-39, wherein the recorded session content comprises presentation content and portions of the audio and/or video streams of one or more selected participants, and do not comprise any portions of audio and/or video streams from non-selected participants.

Example 41. The non-transitory computer-readable medium of any of Examples 37-40, wherein the session content produced during the communication session comprises: presentation content presented by one or more presenting participants, and audio and/or video streams of the one or more presenting participants.

Example 42. The non-transitory computer-readable medium of Example 41, wherein the presentation content comprises one or more visual slides, and wherein the recorded session content comprises one or more image captures of the visual slides.

Example 43. The non-transitory computer-readable medium of any of Examples 37-42, wherein the designated portion of the session content to be included in the note is configured to be adjustable by one or more participants with granted permission.

Example 44. The non-transitory computer-readable medium of any of Examples 37-43, wherein the session content comprises audio and/or video content generated during the session, and wherein the recorded session content to be included in the note comprises audio and/or video content for a designated window of time prior to receiving the request to generate the note.

Example 45. The non-transitory computer-readable medium of any of Examples 37-44, further comprising: instructions for receiving an indication that a plurality of requests to generate a note have been received from participants that exceeds a threshold number of requests within a designated window of time; prior to receiving the request to generate the note from the participant, instructions for displaying a recommended action within the UI for the participant to pay attention to or request a note for the session content being produced.

Example 46. The non-transitory computer-readable medium of any of Examples 37-45, further comprising: instructions for presenting, to the requesting participant, a note UI comprising selectable options for one or more of: customizing, categorizing, or adding annotation content to the portion of the session content to be included in the note.

Example 47. The non-transitory computer-readable medium of any of Examples 37-46, further comprising: instructions for presenting, to the requesting participant, a note playback UI comprising one or more selectable options for accessing or initiating playback of portions of the session content in the note or one or more previously generated notes associated with the participant.

Example 48. The non-transitory computer-readable medium of any of Examples 37-47, wherein the selectable options for accessing or initiating playback of portions of the session content in the note or one or more previously generated notes comprise one or more of: playing back session content at an adjusted rate of speed, displaying a generated transcript alongside session content, displaying a captured visual slide alongside session content, and displaying one or more participant annotations alongside session content.

Example 49. The non-transitory computer-readable medium of any of Examples 37-48, further comprising: instructions for generating, in real time, a transcript for the session content as it is being produced within the communication session, wherein the note additionally comprises a subset of the generated transcript for the session content that corresponds to the portion of the session content in the note.

Example 50. The non-transitory computer-readable medium of any of Examples 37-49, further comprising: instructions for presenting, to a participant of the communication session, a note selection UI comprising a plurality of previously generated notes associated with the participant which can be selected for individual access or playback.

Example 51. The non-transitory computer-readable medium of Example 50, wherein the note selection UI comprises one or more search UI elements configured to enable the participant to search for previously generated notes to be accessed or played back.

Example 52. The non-transitory computer-readable medium of any of Examples 37-51, wherein generating the note comprises cropping one or more visual portions of the recorded session content to remove one or more UI elements visible in the recorded session content.

Example 53. The non-transitory computer-readable medium of any of Examples 37-52, wherein the request from one of the participants to generate a note is initiated by the participant by interactively selecting a UI element for taking a note.

Example 54. The non-transitory computer-readable medium of any of Examples 37-53, wherein the one or more processors are further configured to perform the operations of: detecting one or more automated note taking conditions, wherein the request from one of the participants to generate a note is automatically initiated based on the detecting of the one or more automated note taking conditions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
receiving, from a client device, a first indication of an automated note taking condition that is detected without a participant input;
detecting a second indication in a presentation slide of a communication session, wherein the second indication indicates a copying restriction;
generating a note associated with a recorded portion of the communication session based on the first indication of the automated note taking condition, wherein the note excludes the presentation slide based on the second indication; and
granting the client device access, via the note, to the recorded portion of the communication session.

2. The method of claim 1, further comprising:
recording a portion of session content during the communication session.

3. The method of claim 1, further comprising:
writing a portion of session content to a buffer;
determining that the buffer is at a maximum capacity; and
overwriting the portion of session content.

4. The method of claim 1, further comprising:
writing a portion of session content to a buffer;
determining that the buffer is at a maximum capacity; and
overwriting the portion of session content, wherein the portion of the session content includes presentation content displayed during the communication session.

5. The method of claim 1, further comprising:
writing a portion of session content to a buffer;
determining that the buffer is at a maximum capacity; and
overwriting the portion of session content, wherein a designated portion of the portion of the session content is defined according to an adjustable criteria.

6. The method of claim 1, further comprising:
writing a portion of session content to a buffer;
determining that the buffer is at a maximum capacity; and
overwriting the portion of session content, wherein a designated portion of the portion of the session content is defined according to an adjustable criteria that includes the session content that is transmitted during an adjustable window of time prior to a time of receipt of the note request.

7. The method of claim 1, wherein the note is selectable for at least one of individual access or playback.

8. A system, comprising:
a memory for storing instructions; and
a processor configured to execute the instructions that causes the processor to:
receive, from a client device, a first indication of an automated note taking condition that is detected without a participant input;
detect a second indication in a presentation slide of a communication session, wherein the second indication indicates a copying restriction;
generate a note associated with a recorded portion of the communication session based on the first indication of the automated note taking condition, wherein the note excludes the presentation slide based on the second indication; and
grant the client device access, via the note, to the recorded portion of the communication session.

9. The system of claim 8, wherein the processor is configured to record a portion of session content during the communication session.

10. The system of claim 8, further comprising:
a buffer; and
wherein the processor is further configured to:
write a portion of session content to the buffer;
determine that the buffer is at a maximum capacity; and
overwrite the portion of the session content.

11. The system of claim 8, further comprising:
a buffer; and
wherein the processor is further configured to:
write a portion of session content to the buffer;
determine that the buffer is at a maximum capacity; and
overwrite the portion of session content, wherein the portion of the portion of the session content includes respective portions of an audio stream of the communication session.

12. The system of claim 8, further comprising:
a buffer; and
wherein the processor is further configured to:
write a portion of session content to the buffer;
determine that the buffer is at a maximum capacity; and
overwrite the portion of session content, wherein the portion of the portion of the session content includes respective portions of an audio stream associated with a selected participant device of the communication session.

13. The system of claim 8, wherein the processor is further configured to:
determine that a number of note requests received exceeds a threshold number of requests within a defined time range.

14. The system of claim 8, wherein the processor is further configured to:
generate a transcript for the communication session, wherein the note comprises a subset of the transcript.

15. A non-transitory computer-readable medium comprising instructions, that when executed by a processor, cause the processor to perform operations comprising:
receiving, from a client device, a first indication of an automated note taking condition that is detected without a participant input;
detecting a second indication in a presentation slide of a communication session, wherein the second indication indicates a copying restriction;
generating a note associated with a recorded portion of the communication session based on the first indication of the automated note taking condition, wherein the note excludes the presentation slide based on the second indication; and
granting the client device access, via the note, to the recorded portion of the communication session.

16. The non-transitory computer-readable medium of claim 15, the operations further comprising:
recording a portion of session content.

17. The non-transitory computer-readable medium of claim 15, the operations further comprising:
writing a portion of session content to a buffer;
determining that the buffer is at a maximum capacity; and
overwriting the portion of the session content.

18. The non-transitory computer-readable medium of claim 15, the operations further comprising:
writing a portion of session content to a buffer;
determining that the buffer is at a maximum capacity; and overwriting the portion of session content, wherein the portion of the portion of the session content includes a respective portion of a video stream.

19. The non-transitory computer-readable medium of claim 15, the operations further comprising:
writing a portion of session content to a buffer;
determining that the buffer is at a maximum capacity; and
overwriting the portion of session content, wherein the portion of the portion of the session content includes respective portions of a video stream associated with a selected participant device of the communication session.

20. The non-transitory computer-readable medium of claim 15, further comprising:
determining that a buffer is at a maximum capacity; and
overwriting a portion of the buffer containing session content, wherein a designated portion of the portion of the session content is defined according to an adjustable criteria that includes the session content that is transmitted during an adjustable window of time prior to a time of receipt of the note request.

* * * * *